Figure 1:
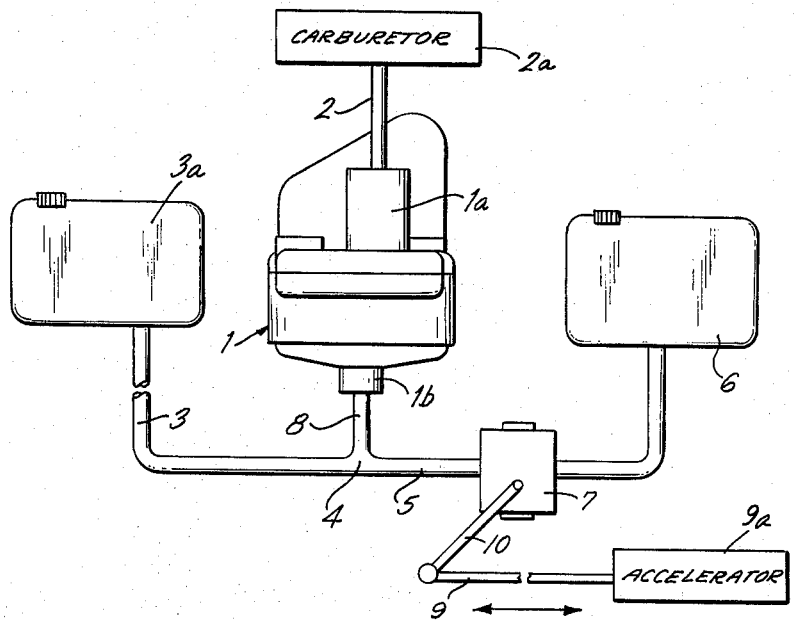

Sept. 28, 1965 H. SCHNEGG ETAL 3,208,442
LUBRICATING SYSTEM FOR TWO-STROKE CYCLE
INTERNAL COMBUSTION ENGINES
Filed Feb. 12, 1964

INVENTORS:
HANSPETER SCHNEGG
EMIL DANN
BY
Michael J. Striker
their ATTORNEY

# United States Patent Office 3,208,442
Patented Sept. 28, 1965

3,208,442
LUBRICATING SYSTEM FOR TWO-STROKE CYCLE INTERNAL COMBUSTION ENGINES
Hanspeter Schnegg, Korntal, and Emil Dann, Stuttgart-Zuffenhausen, Germany, assignors to Ernst Heinkel Aktiengesellschaft, Stuttgart-Zuffenhausen, Germany
Filed Feb. 12, 1964, Ser. No. 344,457
Claims priority, application Germany, Feb. 15, 1963,
H 48,250
17 Claims. (Cl. 123—139)

The present invention relates to two-stroke cycle internal combustion engines, and more particularly to an improved lubricating system for such engines. The lubricating system of our invention is especially suited for use in two-stroke cycle engines of boats and other types of watercraft.

As a rule, two-stroke cycle engines are lubricated by oil or the like which is admixed to fuel. Thus, it is already known to supply such engines with fuel which contains a constant percentage of lubricant. A very serious drawback of such lubricating methods is that, while operating at reduced load, the engine receives too much lubricant so that excess lubricant generates noxious fumes and forms a layer of residue in the crankcase. It was also contemplated to feed lubricant at a rate which is proportional to the r.p.m. and to the load upon the engine, and to admit such controlled quantities of lubricant directly into the carburetor at a point past the main fuel injection nozzle. However, such methods of lubrication also exhibit serious drawbacks, mainly because the mixture of fuel and lubricant is not homogeneous so that the rate at which lubricant must be delivered into the engine exceeds the minimum rate which is necessary for satisfactory lubrication if the lubricant is thoroughly intermixed with fuel.

Accordingly, it is an important object of our invention to provide an improved lubricating system for two-stroke cycle internal combustion engines which is constructed and assembled in such a way that, even though it might not always respond (to changes in r.p.m. and/or load) at the same speed as certain conventional systems, it always insures highly satisfactory intermixing of fuel with lubricant and also that the stream of fuel entering the engine receives only such minimum quantities of lubricant as are absolutely necessary for satisfactory lubrication of all parts whereby no lubricant will go to waste.

Another object of the invention is to provide a lubricating system of the above outlined characteristics which may be utilized in two-stroke cycle internal combustion engines with one or more carburetors.

A further object of the invention is to provide a lubricating system which is capable of forming a highly homogeneous mixture of fuel with lubricant wherein the percentage of lubricant is always proportional to the r.p.m. and/or the momentary load upon the engine.

An additional object of the invention is to provide a lubricating system which insures that the carburetors of a multi-carburetor two-stroke cycle internal combustion engine always receive a mixture of identical homogeneousness and with as little delay as is compatible with thorough intermixing of the two ingredients.

A concomitant object of our invention is to provide a two-stroke cycle internal combustion engine which embodies a lubricating system of the above outlined characteristics.

With the above objects in view, one feature of our invention resides in the provision of a two-stroke cycle internal combustion engine which comprises a source of fuel, a source of lubricant, at least one carburetor, a fuel pump whose outlet is preferably closely adjacent to and is connected with the carburetor, a pair of supply conduits connecting the two sources with the inlet of the fuel pump, and an adjustable lubricant conveying pump provided in the supply conduit which leads from the source of lubricant to deliver into the fuel pump controlled quantities of lubricant so that such lubricant is thoroughly intermixed with fuel prior to entering the carburetor or carburetors.

In accordance with a very important feature of the invention, the flow of lubricant and fuel toward the inlet of the fuel pump takes place countercurrently, and the two ingredients are preferably mixed even before they enter the fuel pump. Thus, the engine preferably comprises a mixing conduit whose intake communicates with the discharge ends of the supply conduits and which discharges into the fuel pump. The lubricant conveying pump is preferably adjustable in synchronism with the accelerator so that the rate at which lubricant flows into the fuel pump depends on the momentary r.p.m. and load upon the engine.

Figure 2:
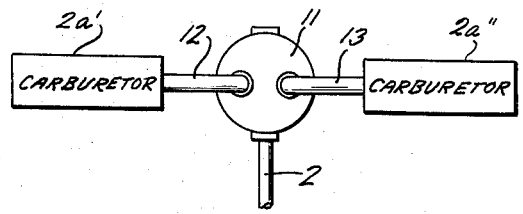

The novel features which are considered as characteristic of the invention are set forth in particular in the appended claims. The improved lubricating system itself, however, both as to its construction and its mode of operation, together with additional features and advantages thereof, will be best understood upon perusal of the following detailed description of certain specific embodiments with reference to the accompanying drawings, in which:

FIG. 1 is a schematic diagram of a lubricating system for a two-stroke cycle internal combustion engine with a single carburetor; and FIG. 2 is a diagram showing a portion of a modified lubricating system for a two-stroke cycle engine with two carburetors.

Referring to the drawings, and first to FIG. 1, there is shown the lubricating system of a two-stroke cycle internal combustion engine with a single carburetor 2a. The carburetor 2a receives fuel or a mixture of fuel and lubricant through a feed conduit 2 which is connected to the outlet 1a of a conventional diaphragm type fuel pump 1. The inlet 1b of this fuel pump is connected with the discharge end of a short mixing conduit 8 whose intake is connected with the discharge ends of two aligned supply conduits including a fuel supply conduit 3 which leads to a fuel tank 3a and a lubricant supply conduit 5 which leads to an oil tank 6. The conduit 5 accommodates an adjustable lubricant conveying pump 7 whose output is controlled by an operative connection here shown as a link train including a lever 9 which is reciprocable by the accelerator 9a of the engine so that it may rock a link 10 in dependency on adjustments in the position of the throttle valve.

The feed conduit 2 is preferably short to make sure that the carburetor 2a receives a different mixture of fuel and lubricant without undue delay, i.e., shortly after the link train including the parts 9, 10 adjusts the output of the oil pump 7. In other words, the interval between the time the oil pump 7 receives an impulse to deliver lubricant at a different rate and the time the thus altered mixture of fuel and lubricant enters the carburetor 2a should be as short as possible which means that the carburetor should be mounted in rather close proximity of the outlet 1a.

The link train including the parts 9, 10 insures that the percentage of lubricant in the mixture flowing through the feed conduit 2 varies in dependency on the load conditions and/or r.p.m. of the engine.

The feature that fuel and lubricant flow countercurrently, namely, that the flow of fuel in the supply conduit 3 takes place in a direction counter to the flow of lubricant in the supply conduit 5, contributes to more satisfactory intermixing of the two components, and such partially homogenized mixture is homogenized still further in the fuel pump 1 prior to entering the feed conduit 2 and carburetor 2a.

In conceiving our invention, we came to the conclusion that, particularly in a two-stroke cycle boat engine, a lubricating system which is somewhat slower to react in response to changes in r.p.m. and/or load is preferable to a system which reacts instantaneously or almost instantaneously but which will furnish a mixture of less satisfactory homogeneousness. It was determined that conventional systems which change the percentage of lubricant with little or no delay are capable of effecting such rapid changes at the expense of homogeneousness of the resulting mixture, and also that the lubricating effect of partially intermixed lubricant is less satisfactory than the effect of an intimately admixed lubricant even though the mixture of less satisfactory homogeneousness might contain such quantities of lubricant as are in optimum proportion to the momentary r.p.m. and load upon the engine. This is due to the fact that an engine which receives a less homogeneous mixture of fuel with lubricant consumes more lubricant than an engine which always receives lubricant in intimate admixture with the fuel stream.

When the outlet 1a of the fuel pump 1 delivers fuel or a mixture of fuel with lubricant to a plurality of carburetors, we prefer to provide a comparatively small auxiliary tank or reservoir 11, shown in FIG. 2, which is connected with the discharge end of the feed conduit 2 and which respectively supplies a homogeneous mixture of fuel and lubricant to two carburetors 2a', 2a'' via connecting conduits 12, 13. At least the intakes of the conduits 12, 13 are preferably disposed at the same level to make sure that the homogeneousness of streams flowing to the carburetors 2a', 2a'' always remains the same.

The remainder of the lubricating system for the two-stroke cycle engine which embodies the carburetors 2a', 2a'' is the same as that shown in FIG. 1.

Without further analysis, the foregoing will so fully reveal the gist of the present invention that others can, by applying current knowledge, readily adapt it for various applications without omitting features which fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. In a two-stroke cycle internal combustion engine, in combination, a source of fuel; a source of lubricant; carburetor means; a fuel pump having an inlet and an outlet; feed conduit means connecting the outlet of said fuel pump with said carburetor means; mixing conduit means connected with the inlet of said fuel pump; first supply conduit means connecting said source of fuel with said mixing conduit means so that, when said fuel pump is in operation, a stream of fuel flows through said conduit means to said carburetor means; second supply conduit means connecting said source of lubricant with said mixing conduit means; and an adjustable lubricant conveying pump provided in said second supply conduit means to deliver controlled quantities of lubricant into said mixing conduit means so that such lubricant is thoroughly admixed to fuel and the resulting homogeneous mixture is delivered by said fuel pump through said feed conduit means and to said carburetor means, the action of said fuel pump on said mixture resulting in an even higher degree of homogeneity of said mixture.

2. In a two-stroke cycle internal combustion engine, in combination, a source of fuel; a source of lubricant; carburetor means; a fuel pump having an inlet and an outlet; feed conduit means connecting the outlet of said fuel pump with said carburetor means; mixing conduit means connected with the inlet of said fuel pump; first supply conduit means connecting said source of fuel with said mixing conduit means so that, when said fuel pump is in operation, a stream of fuel flows through said conduit means to said carburetor means; second supply conduit means connecting said source of lubricant with said mixing conduit means; adjustable accelerator means; an adjustable lubricant conveying pump provided in said second supply conduit means to deliver controlled quantities of lubricant into said mixing conduit means so that such lubricant is thoroughly admixed to fuel and the resulting homogeneous mixture is delivered by said fuel pump through said feed conduit means and to said carburetor means, the action of said fuel pump on said mixture resulting in an even higher degree of homogeneity of said mixture; and an operative connection between said accelerator means and said adjustable lubricant conveying pump for effecting adjustments of said last mentioned pump in response to adjustments of said accelerator means.

3. In a two-stroke cycle internal combustion engine, in combination, a source of fuel; a source of lubricant; carburetor means; a fuel pump having an inlet and an outlet with the latter closely adjacent to said carburetor means; comparatively short feed conduit means connecting the outlet of said fuel pump with said carburetor means; mixing conduit means connected with the inlet of said fuel pump; first supply conduit means connecting said source of fuel with said mixing conduit means so that, when said fuel pump is in operation, a stream of fuel flows through said conduit means to said carburetor means; second supply conduit means connecting said source of lubricant with said mixing conduit means; and an adjustable lubricant conveying pump provided in said second supply conduit means to deliver controlled quantities of lubricant into said mixing conduit means so that such lubricant is thoroughly admixed to fuel and the resulting homogeneous mixture is delivered by said fuel pump through said feed conduit means and to said carburetor means, the action of said fuel pump on said mixture resulting in an even higher degree of homogeneity of said mixture.

4. In a two-stroke cycle internal combustion engine, in combination, a source of fuel; a source of lubricant; a single carburetor; a fuel pump having an inlet and an outlet with the latter closely adjacent to said carburetor; comparatively short feed conduit means connecting the outlet of said fuel pump with said carburetor; mixing conduit means connected with the inlet of said fuel pump; first supply conduit means connecting said source of fuel with said mixing conduit means so that, when said fuel pump is in operation, a stream of fuel flows through said conduit means to said carburetor; second supply conduit means connecting said source of lubricant with said mixing conduit means; and an adjustable lubricant conveying pump provided in said second supply conduit means to deliver controlled quantities of lubricant into said mixing conduit means so that such lubricant is thoroughly admixed to fuel and the resulting homogeneous mixture is delivered by said fuel pump through said feed conduit means and to said carburetor, the action of said fuel pump on said mixture resulting in an even higher degree of homogeneity of said mixture.

5. In a two-stroke cycle internal combustion engine, in combination, a fuel tank; a second tank arranged to accommodate a supply of lubricant; a carburetor; a diaphragm type fuel pump having an inlet and an outlet with the latter closely adjacent to said carburetor; a short feed conduit connecting said carburetor with said outlet; a mixing conduit connected with said inlet and having an intake spaced from said fuel pump; a first supply conduit connecting said intake with said fuel tank so that, when said fuel pump is in operation, a stream of fuel flows through said conduits to said carburetor; a second supply conduit connecting said second tank with said intake; an adjustable pump mounted in said second supply conduit; an adjustable accelerator; and a link train connecting said adjustable pump with said accelerator for effecting adjustments of said adjustable pump in response to and proportionally with adjustments of said accelerator whereby said adjustable pump delivers controlled quantities of lubricant into said mixing tube wherein such lubricant is admixed to fuel and the resulting mixture is homogenized by said fuel pump prior to its delivery to said carburetor, the action of said fuel pump on said mixture resulting in an even higher degree of homogeneity of said mixture.

6. In a two-stroke cycle internal combustion engine, in combination, a source of fuel; a source of lubricant; carburetor means; a fuel pump having an inlet and an outlet; feed conduit means connecting the outlet of said fuel pump with said carburetor means; mixing conduit means connected with the inlet of said fuel pump and having an intake; first supply conduit means connecting said source of fuel with the intake of said mixing conduit means so that, when said fuel pump is in operation, a stream of fuel flows through said conduit means to said carburetor means; second supply conduit means connecting said source of lubricant with the intake of said mixing conduit means; and an adjustable lubricant conveying pump provided in said second supply conduit means to deliver controlled quantities of lubricant into said mixing conduit means so that such lubricant is thoroughly admixed to fuel and the resulting homogeneous mixture is delivered by said fuel pump through said feed conduit means and to said carburetor means, the action of said fuel pump on said mixture resulting in an even higher degree of homogeneity of said mixture.

7. A combination as set forth in claim 6, wherein said supply conduit means comprise portions adjacent to the intake of said mixing conduit means, and the direction of fuel flow being counter to the direction in which the lubricant flows to said intake.

8. A combination as set forth in claim 7, wherein said intake is closely adjacent to the inlet of said fuel pump.

9. In a two-stroke cycle internal combustion engine, in combination, a source of fuel; a source of lubricant; a plurality of carburetors; a reservoir; a plurality of connecting conduits connecting said reservoir with said carburetors; a fuel pump having an inlet and an outlet; a feed conduit connecting said outlet with said reservoir; a mixing conduit connected with said inlet; a first supply conduit connecting said source of fuel with said mixing conduit so that, when said fuel pump is in operation, a stream of fuel flows through said conduits and through said reservoir to said carburetors; a second supply conduit connecting said mixing conduit with said source of lubricant; and an adjustable pump provided in said second supply conduit to deliver controlled quantities of lubricant into said mixing conduit so that such lubricant is admixed to the stream of fuel, the action of said fuel pump on said mixture resulting in an even higher degree of homogeneity of said mixture.

10. A combination as set forth in claim 9, wherein said connecting conduits are disposed at the same level.

11. A combination as set forth in claim 9, wherein said engine comprises two carburetors.

12. In a two-stroke cycle internal combustion engine, in combination, a source of fuel; a source of lubricant; carburetor means; a fuel pump having an inlet and an outlet with the later connected to said carburetor means; a pair of supply conduit means connecting said sources with the inlet or said fuel pump; and an adjustable pump provided in the supply conduit means for lubricant and arranged to deliver into said fuel pump controlled quantities of lubricant which is thoroughly admixed to fuel by said fuel pump prior to entering said carburetor means.

13. A combination as set forth in claim 12, further comprising adjustable accelerator means operatively connected with said adjustable pump so that said last mentioned pump is adjusted simultaneously with said accelerator means whereby the rate of lubricant flow into said fuel pump may be regulated in dependency on the r.p.m. of and/or load upon the engine.

14. A combination as set forth in claim 12, further comprising comparatively short feed conduit means connecting the outlet of said fuel pump with said carburetor means.

15. A combination as set forth in claim 12, wherein said carburetor means comprises a plurality of carburetors and further comprising a reservoir connected with the outlet of said fuel pump, and conduits connecting said reservoir with said caburetors, said last mentioned conduits having intakes provide at the same level so that the mixtures of fuel with lubricant delivered to said carburetors are of identical homogeneousness.

16. A combination as set forth in claim 12, wherein said supply conduits merge at a point ahead of said inlet and wherein the flow of lubricant to said point is counter to the flow of fuel to said point.

17. In a two-stroke cycle internal combustion engine of the type having at least one carburetor and one fuel pump and which is lubricated by a lubricant in admixture with fuel, the improvement which consists in that lubricant is thoroughly intermixed with fuel in said fuel pump and that lubricant is admitted to fuel at a rate proportional with the r.p.m. and/or load upon the engine.

References Cited by the Examiner

UNITED STATES PATENTS

| | | | |
|---|---|---|---|
| 2,935,057 | 5/60 | Perlewitz | 123—73 |
| 2,938,509 | 9/60 | Carbonero | 123—139 |
| 2,968,298 | 1/61 | Meurer | 123—139 |
| 3,114,356 | 12/63 | Werner | 123—73 |

KARL J. ALBRECHT, *Primary Examiner.*